Feb. 25, 1969  J. POMAGALSKI  3,429,279
DEVICE FOR SUPPORTING AND GUIDING THE CABLE OF AN AERIAL CABLEWAY
Filed Dec. 20, 1966  Sheet _1_ of 2
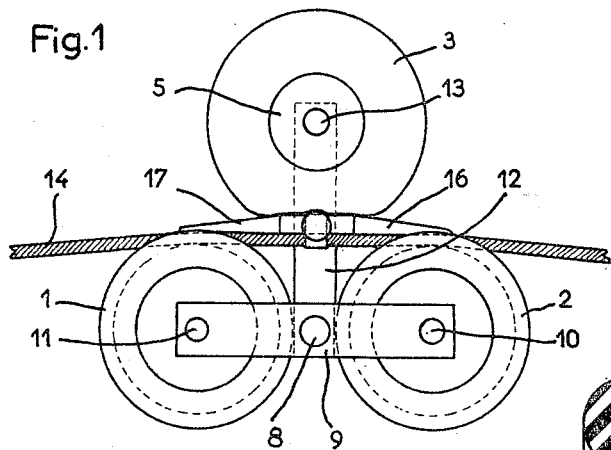
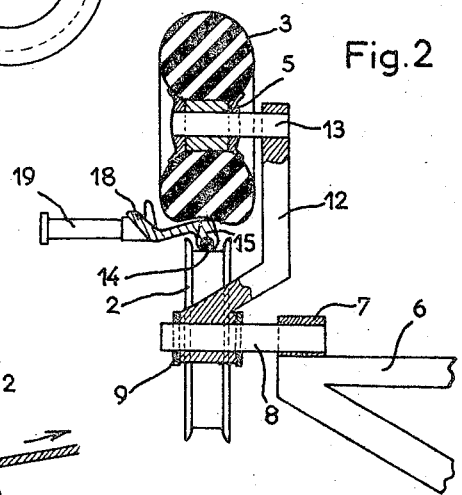
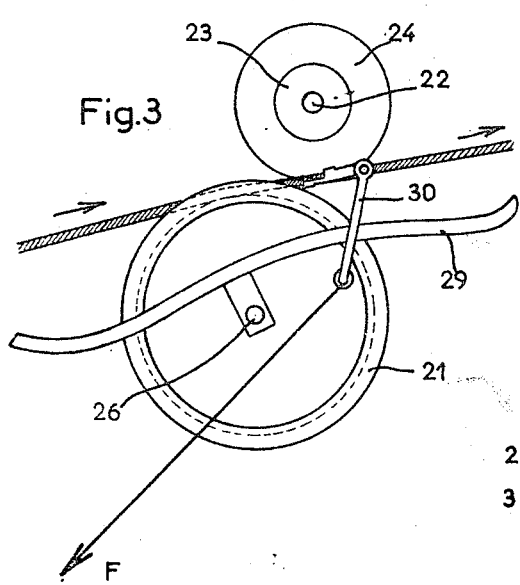
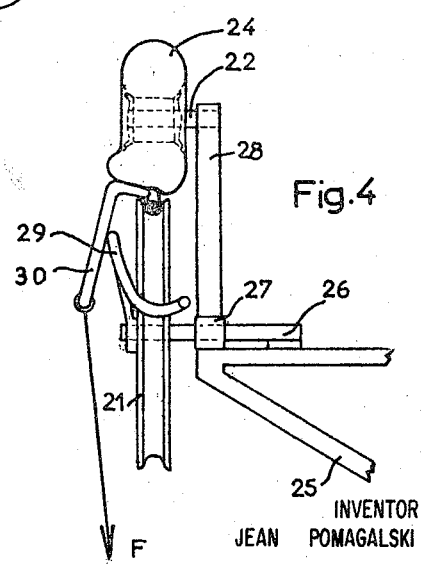
INVENTOR
JEAN POMAGALSKI
BY Arthur Schwartz
ATTORNEY Fig: 5
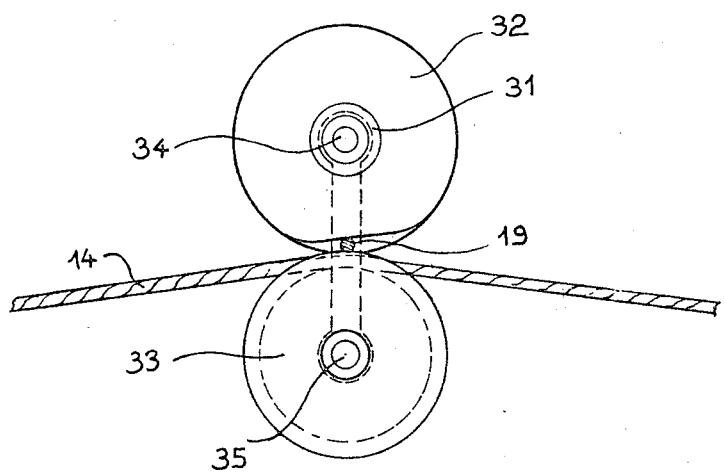
Fig: 6
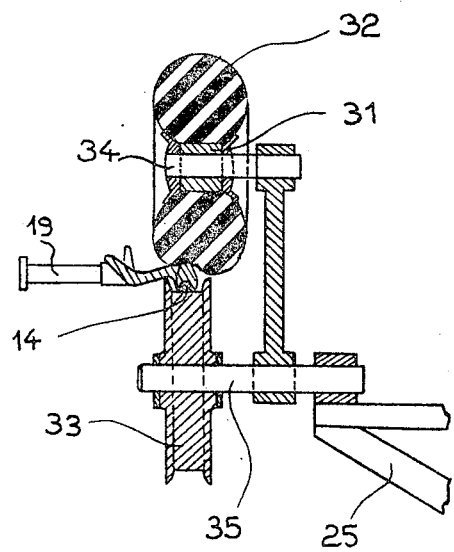
INVENTOR
JEAN POMAGALSKI
BY *Arthur Schwartz*
ATTORNEY

United States Patent Office 3,429,279
Patented Feb. 25, 1969

3,429,279
DEVICE FOR SUPPORTING AND GUIDING THE CABLE OF AN AERIAL CABLEWAY
Jean Pomagalski, 114 Avenue de l'Eygala,
La Tronche, France
Filed Dec. 20, 1966, Ser. No. 603,342
U.S. Cl. 104—197                          8 Claims
Int. Cl. B61b 7/04, 7/10, 11/00

ABSTRACT OF THE DISCLOSURE

A device for supporting the movable cable of an aerial cableway comprising at least one wheel with a resilient elastic cushion and at least one supporting pulley with a groove, said cushion urging said cable into said groove.

---

The present invention relates to devices for supporting and guiding the cable of an aerial cableway or overhead conveyors.

Its object is to simplify the arrangements known at the present time, particularly when it is necessary both to support the cable and to hold it for which purpose there are generally employed grooved supporting pulleys over which the cable passes and holding rollers, known as compression rollers, below which the cable passes.

The simplest and most desirable arrangement comprises providing, at each supporting tower or structure for which it is necessary to provide both for the support and the compression of the cable, two support pulleys between which a compression roller is provided. Unfortunately such an arrangement cannot be used when the attachment of the loads commonly known as suspension or tow are securely fastened to the cable by gripping devices or jaws which clamp the cable from above, as is generally the case.

The excessive flexings imposed upon the cable when the jaws pass below the compression roller, while the cable is at the same time supported a short distance away by the supporting pulleys, cause a rapid deterioration of the cable, and this is the reason why most manufacturers avoid the support-compression combinations, using only towers provided solely with supporting pulleys or solely with compression rollers, which has the drawback of increasing the number of towers, as well as the number of rollers. Other manufacturers adopt other solutions which comprise springs or complicated articulations and generally series of at least four compression rollers generally mounted on a rocker arm, a supporting pulley being provided forwards and backwards said series, this representing a rather substantial amount of equipment which not only requires stronger towers, but in addition—regardless of the precautions which may be taken—has the result that the load is subjected to relatively violent vibrations during the operation of these devices.

It has been attempted to return to the ideal including two pulleys and a roller arrangement described above by using special devices for fastening the attachment to the cable, these devices being inserted laterally in the cable and therefore not resulting in any protrusion of fastening device above the cable. However, in this case one is forced to abandon the use of supporting pulleys having a deep groove and in view of the lack of reliability which results therefrom, this arrangement has met with little acceptance.

It is, as a matter of fact, generally agreed that the use of pulleys having a deep groove is extremely desirable and practically indispensable in order to avoid derailings, which results in the necessity of having jaws protruding extensively above the cable, which therefore makes it particularly difficult to solve the above-mentioned problems of the compression, and, more particularly, of the combination of support and compression.

The present invention solves these problems in the manner that it provides a very general advantageous solution to the problems of compression proper in the event that fastening devices which protrude extensively above the cable are used. This solution at the same time solves in very advantageous fashion the problem of the support-compression combination and in particular those problems which are specific to fastening devices of the so-called disengageable type.

In the case of said type of fastening device, it is necessary, as a matter of fact, upon passage of the support pulleys, to divert the attachment of the load extensively from the vertical by means of a guide rail, so that it is necessary to use at least one compression roller, which however is extensively offset in the direction of movement with respect to the vertical plane passing through the axis of the pulley, this offset being necessary in order that the attachment have the time to resume its normal position when it passes below the compression roller.

The present invention makes it possible to dispose the axis of the roller into the vertical plane of the axis of the pulley or at least its immediate vicinity.

In accordance with the present invention there is employed as a compression roller a rotating wheel having a peripheral rigid rim and a resilient elastic cushion encircling and fitting into said rim and preferably a wheel encircled by a pneumatic-tire, preferably inflated to such a pressure that, as a result of deformation, the pneumatic-tire roller can encase the passage of the fastening device without, for all practical purposes, imparting to the latter the downward movement which is the cause of cable breaks.

In the case of simple compression, the roller according to the invention will be used in combination with a sole guide pulley.

In the case of the support-compression combination, the roller according to the invention will be used in combination with the support pulleys, the vertical planes which pass through the axes of the pulleys being offset on opposite sides of the vertical plane passing through the axis of the roller.

In the particular case of disengageable fastening devices, said roller will be used in combination with a guide pulley or a guide and support pulley.

It is obvious that these basic combinations can be advantageously combined with each other in the case of substantial angular deviations in the path of the cable in the vertical plane or else in the case of deviations in the horizontal plane, or in intermediate cases, that is to say in all cases in which it will be advisable to employ a plurality of rollers and pulleys.

Another advantage of the device according to the invention resides in the fact that if it is desired to increase or decrease the pressure of the cable on a roller, it is possible, by adjusting the inflation pressure of the tire, to regulate the pressure exerted by the cable without having to change the axis-to-axis distances.

In general, the return to the ideal combination of compression roller according to the invention between two supporting pulleys, makes it possible to provide larger angles in the path of the cable and thus makes it possible to follow more easily the form of the terrain without having to change, or change excessively, the height of the towers and, in certain cases, the number of towers. In the accompanying drawings:

FIG. 1 shows, in front view, a device in accordance with the invention having two support pulleys and one compression roller in accordance with the invention.

FIG. 2 is an elevation in cross-section, but in a direction perpendicular to the direction in which the device is viewed in FIG. 1.

FIG. 3 is a device in accordance with the invention, seen in front view, in the case of an installation having disengageable fastening devices.

FIG. 4 is an elevation, seen in a direction perpendicular to that of FIG. 3.

FIG. 5 is a front view of another embodiment according to the invention.

FIG. 6 is an elevation in cross-section of the device of FIG. 5.

In FIGURES 1 and 2, 1 and 2 are the two grooved supporting pulleys and 3 is the compression roller or wheel comprising a pneumatic tire, preferably of the so-called balloon type, arranged around a rim 5.

The assembly consisting of the pulleys 1 and 2 and the roller 3 is borne by a tower or supporting structure, merely a bracket of which has been shown at 6.

This bracket bears, by any suitable supporting blocks represented schematically at 7, a pin 8 around which there may pivot, in a vertical plane, a rocker arm 9 on which there are mounted the pins 10 and 11 passing through the two support beams of the rocker arm, and which serve as shafts for rotation of the pulleys 1 and 2.

There is rigidly connected with the rocker arm 9 a bent support 12 bearing the pin 13 parallel to the pin 8, and the rim 5 of the tire is mounted on said pin 13.

The cable is designated by 14 and—as can be noted best from FIG. 2—is grasped by a gripping device on jaw 15, the details of which are not shown since there are a very large number of such jaws on the market and the design of the jaw does not form part of the present invention.

The jaw 15 is provided with the customary switch-points 16 and 17 which facilitate the passage of the jaw below the compression roller.

Finally the jaw is rigidly connected with an arm 18 which bears the attachment itself, the attachment being indicated solely by a pin 19 on which the load is suspended.

The characteristics of the tire 3 and its inflation pressure have been selected in such a manner that the tire can by its bending fit around the protrusion formed by the jaw 15.

Although not shown, one could provide on the inside of the tire a safety device consisting of an inner rim, the periphery of which establishes the maximum permitted flexure, so that if an accidental deflation should occur, the safety rim would for the time being act as compression roller until the tire could be changed or reinflated.

In FIGURES 3 and 4, 21 is the supporting pulley, the compression wheel consisting—as in the previous example—of a rim 23 and a tire proper 24.

The unit consisting of the supporting pulley and compression wheel is supported as in the previous example by a bracket 25 of a tower, the pin 26 of the pulley 21 being supported by the bracket via any suitable supporting blocks represented schematically at 27. The compression roller is supported by the pin 22 of the support 28 which in its turn is directly supported by the bracket 25.

In certain cases (see FIGURES 5 and 6) it will be useful to dispose a wheel 31 equipped with a pneumatic tire 32 in front of a single grooved pulley 33 so that the tire 32 presses the cable 14 radially into the groove of pulley 33. In this embodiment the plane containing the axes 34 and 35, respectively of the wheel 31 and of the pulley 33, is traversed perpendicularly by the cable 14. This arrangement prevents the cable 14 from leaving the groove, even if the cable changes its direction at the nipping zone between the wheel and the pulley.

As is known in the case of disengageable attachments, each tower is provided with a guide rail 29, the purpose of which is to move away from the grooved pulley 21 the attachment 30 proper which bears the load exerting a force on the attachment in the direction indicated by the arrow F.

As a result of the invention, the tire, as shown in FIGS. 3 and 4 which is suitably selected and inflated to readily fit around the protrusion formed by the jaw, takes up the lateral deformation imposed upon it by the deflection which is itself imposed upon the attachment by the rail 29.

Having thus described my invention, what I claim is:

1. In a device for supporting the movable cable of an aerial cableway in which a load is secured to said cable by means of a gripping device, said gripping device being firmly secured to said cable and includes an outwardly projecting portion on said cable, the combination of a rotating cable supporting pulley having a groove, a rotating wheel having a peripheral rigid rim, and a resilient elastic cushion encircling and fitting into said rim, the outer periphery of said cushion and of said groove being in cable contacting opposed relationship, said cushion urging said cable elastically in said groove, the resilience of said cushion being such that said cushion is deformed by said projecting portion during the passing of said gripping device between said pulley and said wheel substantially without changing the relative position of said rim and said groove.

2. In a device for supporting and guiding the movable cable of an aerial cableway in which a load is secured to said cable by means of a gripping device which is firmly secured to said cable and includes a portion outwardly protruding from said cable, the combination of a pulley rotatably mounted on a first axis and having a peripheral groove, a wheel rotatably mounted on a second axis, a stationary rigid supporting structure, said first and said second axes being firmly secured to said supporting structure, and a resilient cushion encircling the periphery of said wheel and retaining said cable in said groove, whereby the resilience of said cushion can absorb said protruding portion of said gripping device without substantially changing the track of said cable relative to said supporting structure during the passing of said gripping device between said axes.

3. An aerial cableway comprising in combination a movable cable, a gripping device to secure a load onto said cable, at least a rotating pulley having a groove, at least a rotating wheel, a pneumatic resilient cushion encircling the periphery of each of said wheels whereby the outer peripheral surface of said cushion urges said cable elastically in said groove.

4. A device as set forth in claim 3 comprising a pair of grooved aligned cable supporting pulleys, the axes of which are parallel, said wheel being interposed between said pair of pulleys, the axis of said wheel being parallel to the axes of said pulleys.

5. In a device for guiding the movable cable of an aerial cableway the combination of a pulley rotating about a first axis and having a peripheral cable supporting groove, a wheel encircled by a pneumatic tire and rotating about a second axis, said tire pressing said cable in said groove, said first and second axes being in a plane which is perpendicularly traversed by said cable.

6. A device as set forth in claim 1 wherein said gripping device comprises an arm projecting laterally from said cable, the lateral dimension of said cushion being such that said cushion presses simultaneously on said cable and on said arm during the passing of said gripping device between said pulley and said wheel.

7. In a device for guiding the movable cable of an aerial cableway the combination of a rotating pulley having a cable guiding groove, a rotating wheel, a pneumatic tire encircling said wheel, said tire urging said cable in said groove.

8. In a device for guiding the movable cable of an aerial cableway the combination of a rotating pulley having a peripheral cable guiding groove having upstanding rims, a rotating pneumatic tire, said tire rolling on said rims.

References Cited

UNITED STATES PATENTS 3,347,172 10/1967 Sowder _____ 104—173

ARTHUR L. LA POINT, *Primary Examiner.*

D. F. WORTH, *Assistant Examiner.*

U.S. Cl. X.R.

104—173